United States Patent [19]

Gilson

[11] 4,096,747
[45] Jun. 27, 1978

[54] DIGITAL OUTPUT, POSITIVE DISPLACEMENT FLOW METER

[76] Inventor: Paul R. Gilson, 10012 Highcliff Dr., Santa Ana, Calif. 92705

[21] Appl. No.: 621,884

[22] Filed: Oct. 14, 1975

[51] Int. Cl.² ............................................. G01F 3/16
[52] U.S. Cl. ........................................ 73/251; 91/224
[58] Field of Search ................. 73/239, 248, 249, 250, 73/251; 91/222, 224, 229

[56] References Cited

U.S. PATENT DOCUMENTS

| 199,352 | 1/1878 | Chandler | 73/248 |
| 245,310 | 8/1881 | Morison | 91/222 |
| 474,241 | 5/1892 | Goodman | 73/239 |
| 3,279,326 | 10/1966 | Harvey et al. | 91/229 X |
| 3,440,878 | 4/1969 | Sargent | 73/250 X |
| 3,893,203 | 7/1975 | Berkelius | 91/229 X |
| 3,960,058 | 6/1976 | Berkelius | 91/224 |

FOREIGN PATENT DOCUMENTS 1,051,710 12/1966 United Kingdom .................... 73/239

Primary Examiner—Richard C. Queisser
Assistant Examiner—John P. Beauchamp
Attorney, Agent, or Firm—Knobbe, Martens, Olson, Hubbard & Bear

[57] ABSTRACT

A positive displacement, reciprocating fluid flow meter produces a digital electrical output signal. The meter includes a piston which reciprocates within a cylinder for accurately measuring fuel flow rates over a wide range of rates. The device is particularly useful in measuring the rate of flow of fuel to an engine, and incorporates a valve for bypassing the piston to permit resetting of the meter at the end of each piston stroke.

25 Claims, 6 Drawing Figures

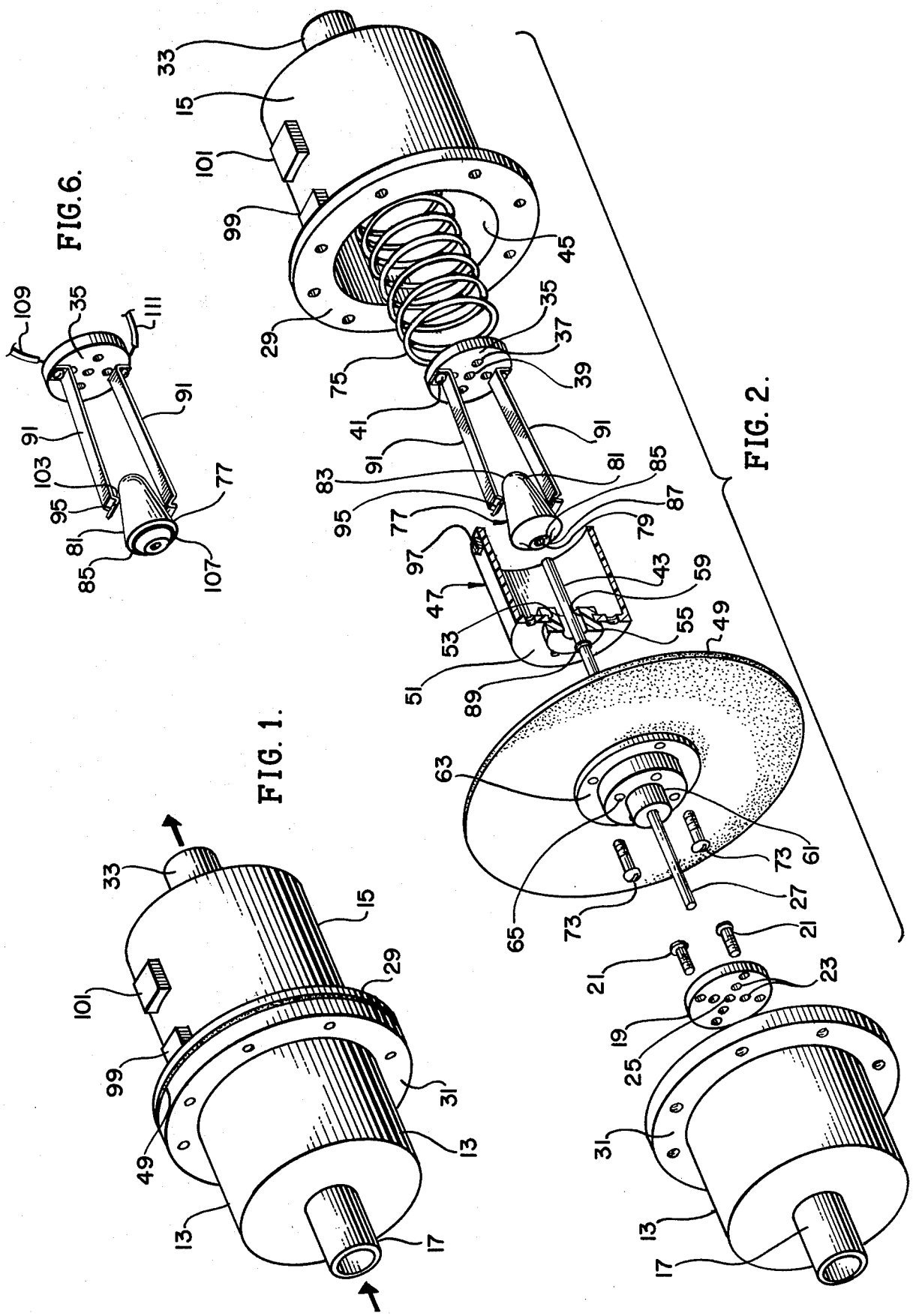

DIGITAL OUTPUT, POSITIVE DISPLACEMENT FLOW METER

BACKGROUND OF THE INVENTION

This invention relates to positive displacement digital fluid flow meters and more particularly to fluid flow meters adapted to measuring the flow of fuel to an internal combustion engine.

A variety of mechanisms have been used in the past to provide a measurement of the rate of flow of fuel to engines. Such devices, in most instances, incorporate a rotating member in the fuel flow which rotates at a speed governed by the flow rate. Alternatively, a reciprocating body has been mounted in a fuel line, and fuel flows around the body to position the mechanism in accordance with the viscous flow of the fluid over this element. Such fuel flow meters are generally accurate over a fairly narrow range of flow rates and are not adapted to measuring fuel flow at extremely low flow rates. Furthermore, such devices generally connect to monitoring equipment through complex cabling, conduits or shafts, making their installation on a vehicle difficult and costly. Due to the nature of these devices, they are subject to inaccuracies caused by changes in the viscosity of the fluid being measured which may result, for example, from temperature changes. They are additionally subject to inaccuracies resulting from wear of moving parts and the increased friction caused thereby. Additionally, such meters do not lend themselves to the rugged construction normally required in a vehicle where continuous vibration can damage the meters, since such meters often include lightweight, rapidly rotating elements with low friction bearings, which fragile elements are easily damaged in a vibrating environment.

In addition, attempts have been made in the prior art to monitor the signals within electric fuel pumps to utilize such signals as an indication of fuel flow rates. Such installations, of course, require that the automobile or other vehicle being monitored include an electric fuel pump and that this fuel pump be accurately gaged so that the amount of fluid per stroke is known. Particularly when the meter is to be added to an existing vehicle, these factors make the use of the electric fuel pump as a fuel measuring instrument unacceptable for a wide range of vehicles.

Other attempts at positive displacement monitoring of fuel flow have been made by monitoring the extent of the stroke of a mechanical fuel pump which is a part of the engine being monitored. Each such device, however, requires a modification of the fuel pump itself for monitoring purposes, which is both complex and expensive and therefore impractical for addition to an existing vehicle.

SUMMARY OF THE INVENTION

The present invention alleviates these and other difficulties associated with the prior art by utilizing a passive, positive displacement reciprocating meter which produces digital output signals. This device is rugged in construction and is not susceptible to inaccuracies due to friction, temperature, or fluid viscosity changes. Furthermore, the device is easily manufactured to produce output digital signals corresponding to a precalibrated fuel flow so that the time delay between successive digital signals may be used as a direct indication of fuel flow rates. The device, being a passive element in the fuel flow system, is easily inserted on any vehicle by simply inserting the device into the fuel flow line at any point which is convenient to the monitoring devices.

These advantages are accomplished by utilizing as a fuel flow monitoring system a piston which reciprocates within a cylinder, one end of the cylinder being connected to the fuel source, such as a fuel pump, and the other end of the cylinder being connected to the output fuel flow line. The piston is urged toward the input fuel flow line within the cylinder by a spring so that, without a pressure differential across the piston, the piston will move toward the inlet end of the cylinder. Fuel flowing into the input port under pressure will move the piston within the cylinder, overcoming the bias of the spring, so that the piston moves toward the outlet port. When the piston reaches a predetermined location adjacent the outlet port, a bypass valve is automatically opened, bypassing fluid from the inlet port to the outlet port through the piston so that the pressure differential across the piston is removed. The piston therefore moves toward the inlet port under the bias of the spring. When the piston reaches a predetermined location adjacent the inlet port, the bypass valve is automatically closed to cause the piston to again move toward the outlet port in response to fluid admitted through the inlet port.

A magnet is located on the piston structure and magnetic reed switches are located outside of the cylinder to be actuated by the magnet. Thus, as the piston reciprocates within the cylinder, the position of the piston at two extreme positions within the cylinder may be monitored. The reed switches produce output digital signals indicative of the beginning and end of each positive displacement stroke of the piston when the bypass valve is closed and thus produce signals displaced in time by a delay which is equivalent to the time period required for the flow of a precalibrated quantity of fuel.

These and other advantages of the present invention are best understood through a reference to the drawings in which:

FIG. 1 is a perspective view of the fuel flow meter of the present invention;

FIG. 2 is an exploded perspective view showing the various elements of the meter of FIG. 1;

FIG. 6 is a partial exploded view of an alternate embodiment monitoring system for the present invention.

DETAILED DESCRIPTION OF THE PREFERRED EMBODIMENT

Figure 3:
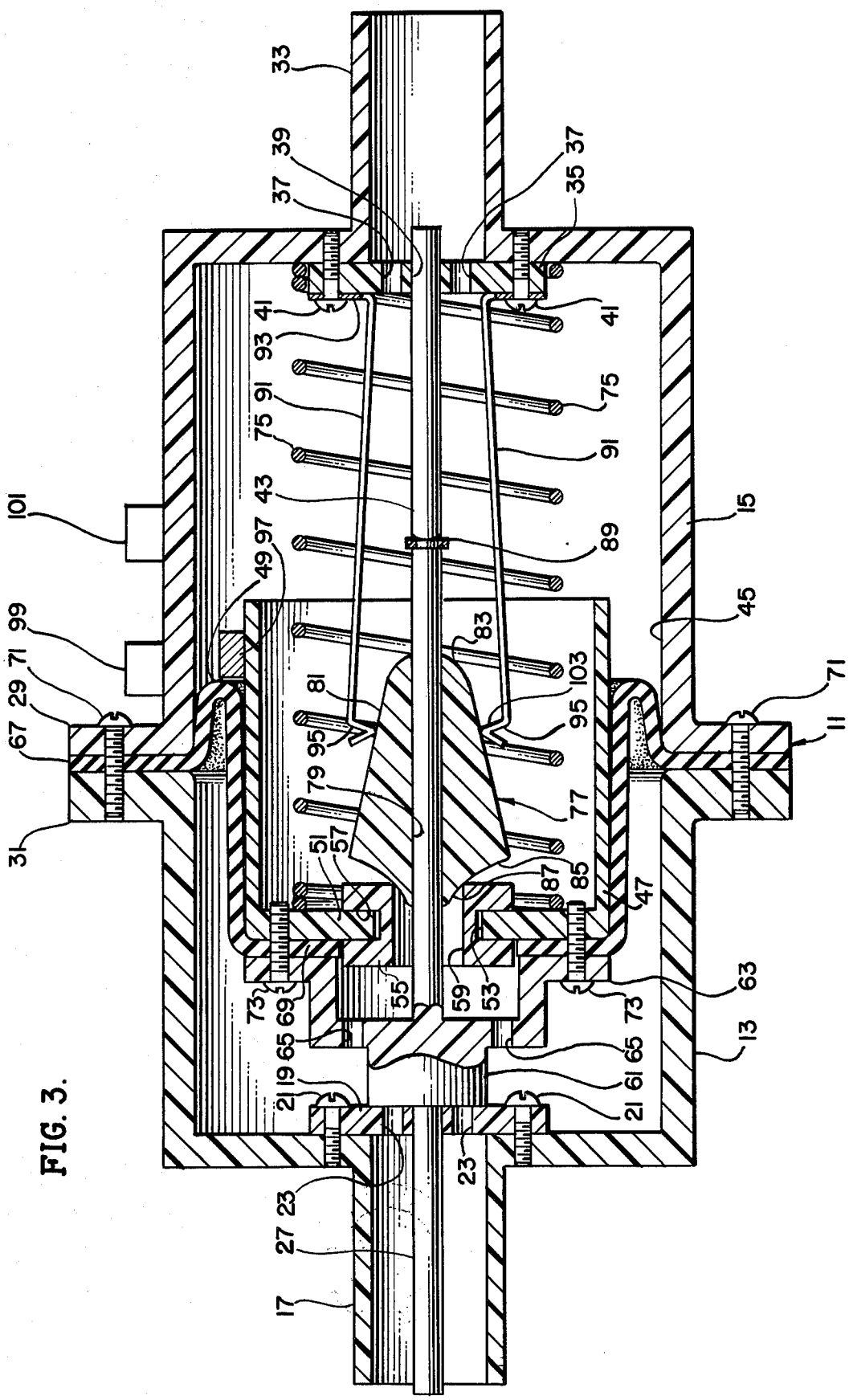
FIGS. 3, 4 and 5 are sectional views of the fuel flow meter of FIG. 1 showing the meter in various stages of operation during its reciprocating cycle.

Referring initially to FIGS. 1, 2 and 3, the construction of the fuel flow meter will be described. The meter is mounted within a cylindrical housing 11 which includes an inlet portion 13 and an outlet portion 15. The inlet portion 13 is formed as a cylindrical cup member having an inlet port 17. The port 17 is designed to interconnect with an inlet conduit, such as a flexible fuel line which may be connected around the port 17 as by a hose clamp. This inlet conduit (not shown) typically connects the port 17 to the vehicle fuel pump outlet.

A bearing plate 19 is positioned within the inlet portion 13 and is formed as a circular plate covering the inlet port 17. The bearing plate 19 may be attached to the inlet portion 13 by a pair of screws 21 or any other convenient fastener, and includes a plurality of inlet orifices 23 for admitting fuel or other fluid from the inlet port 17 to the inlet portion 13. In addition, the bearing plate 19 includes a central bearing aperture 25 for reciprocally mounting a guide rod 27 as will be explained in more detail below.

The outlet portion 15 is a cylindrical cup-shaped member similar to the inlet portion 13 and each of these portions include mating annular external flanges 29 and 31, respectively, for attaching the portions 13, 15 into a single housing 11. The outlet portion 15 includes an outlet port 33 formed as an extending cylindrical tube member similar to the inlet port 17 and adapted for interconnection with a fuel line or other fluid conduit. In a typical installation, this conduit connects the port 33 to the vehicle carburetor inlet. As in the case of the inlet port 17, the outlet port 33 mounts a bearing plate 35 including plural fluid outlet apertures 37, a central bearing aperture 39 and screws 41 supporting the bearing plate 35 on the outlet portion 15. The bearing aperture 39 reciprocally guides a second guide rod 43, as will be explained in more detail below.

The inner cylindrical wall 45 of the housing 11 forms a cylinder for reciprocating movement of a piston 47. The piston 47 may be formed to fit tightly within the cylinder 45, but in the preferred embodiment has a smaller diameter than the cylinder 45 to accommodate a rolling flexible diaphragm 49. This diaphragm 49 positively seals the piston 47 to the cylinder 45 while permitting free motion of the piston 47 along the axis of the housing 11.

The piston 47 is formed as a cylindrical cup member including a flat base portion 51 which is centrally apertured at 53. The central aperture 53 mounts a cylindrical valve seat 55 formed as a grommet with an external annular groove 57 which conforms to the aperture 53 to position the valve seat 55 within the aperture 53 and seal the valve seat 55 to the flat portion 51 of the piston 47. The valve seat 55 is made of a semiresilient polymer material, such as Viton, and includes a central aperture 59 which surrounds the second guide rod 43 but is substantially larger than the guide rod 43 to provide for the flow of fluid between these members.

The guide rod 27 and second guide rod 43 are formed as a unitary element with a piston head 61. The piston head 61 is formed as a cup member having a base flange 63 conforming to the flat portion 51 of the piston 47, and includes a plurality of apertures 65 which permit the flow of fluid to the valve seat 55.

The rolling diaphragm 49 is formed of flexible, fluid impervious material in the shape of an annular ring, the sides of the ring being U-shaped in cross section after the unit is assembled. The ring includes an external annular flange portion 67 and an internal annular flange portion 69 which seal the rolling diaphragm 49 to the housing 11 and piston 47, respectively. In addition, these flanges 67 and 69 form gaskets for the mating portions of the housing 11 and piston 47. Thus, the flange 67 fits between the flanges 29 and 31 of the housing 11 and is pressed between these members by a plurality of screws 71 positioned at spaced intervals around the housing 11. Similarly, the internal flange 69 is pressed between the flat portion 51 of the piston 47 and the flange 63 of the piston head 61 by a plurality of screws 73 positioned at spaced intervals around the flange 63.

The piston 47 with its connected piston head 61 forms a reciprocating assembly which is free to move along the axis of the housing 11 guided by the guide rods 27 and 43 bearing on the apertures 25 and 39. This entire assembly is biased toward the inlet port by a spring 75 which is positioned at one end around the bearing plate 35 and at the other end within the plural screws 73.

A valve bead 77 is formed as a generally conical member having an axial aperture 79. The aperture 79 has a large enough diameter to permit this member 77 to reciprocate freely along the second guide rod 43. This diameter is, however, small enough to provide a seal between the valve bead 77 and second guide rod 43. The external conical surface 81 of the valve bead 77 extends to form a spherical cap 83 at one end of the bead 77. The other end of the bead 77 is formed as a relatively flat base to provide an annular shoulder 85 and a valve head portion 87. The valve head portion 87 is formed to fit within the aperture 59 in the valve seat 55 while the shoulder 85 forms a camming surface, as will be described below.

The valve bead 77 is free to reciprocate along the second guide rod 43, this reciprocation limited at one extreme by the sealing of the valve head 87 within the valve seat 55 and limited at the outlet end extreme by contact between the spherical end 83 and a bead stop 89. This bead stop 89 is formed as a split washer which fits within an annular external groove in the second guide rod 43.

A pair of spring clips 91 are secured by a pair of the plural screws 41 to the outlet port 33. These spring clips 91 are formed as elongate leaf springs terminating at one end with a right angle bend to form a flange portion 93 which is apertured for placement around a screw 41. At the other extremity, the spring clips 91 are bent to form a V-shaped camming portion 95 extending toward the second guide rod 43 and valve bead 77. The spring clips 91 are each formed of spring metal and, when mounted on the screws 41, are biased toward one another so that, even if the valve bead 77 were removed, the V-shaped camming portions would bear against the second guide rod 43. Thus, the spring clips 91 are always biased against the conical camming surface of the valve bead 77 in a direction normal to the axis of the second guide rod 43.

In order to provide external sensing of the position of the piston 47 within the housing 11, a bar magnet 97 is mounted on the outside of the skirt of the piston 47. A pair of magnetic reed switches 99 and 101 are mounted on the external cylindrical wall of the housing 11 proximate the position of the magnet 97 so that when the magnet 97 is positioned below either of the reed switches 99 or 101, the magnet 97 will close that switch to indicate that the piston 47 is at one extreme of its travel. Thus, when the piston 47 has traveled to its extreme position toward the inlet port 17, the magnet 97 will close the magnetic reed switch 99. Similarly, when the piston 47 has traveled to its extreme position toward the outlet port 33, the magnet 97 will close the magnetic reed switch 101.

Operation of the meter described above will now be explained in reference to FIGS. 3 through 5. FIG. 3 shows the flow meter at the beginning of a filling cycle, with the bar magnet 97 positioned beneath the magnetic reed switch 99 closing the switch 99. The spring clips 91 are spread apart slightly by their engagement with the camming surface 81 on the valve bead 77. This biased engagement of the V-shaped camming portions 95 with the camming surface 81 biases the valve bead 77 to the left, as viewed in FIG. 3, that is, toward the inlet port 17, since the V-shaped camming portions 95 tend to slide toward the narrower portions of the valve bead 77.

The valve bead 77 therefore engages with the valve seat 55, and specifically the valve head portion 87 engages with the aperture 59, to close this aperture and thereby seal the piston 47. Fluid enters the inlet port 17, flows through the passages 23 and past the piston head 61 to fill the cavity within the inlet portion 13. Once this cavity has been filled, it will remain filled throughout the life of the meter so that it will not interfere with subsequent measurements. Fluid flows from this cavity within the inlet portion 13 through the apertures 65 to fill the area between the valve seat 55 and piston head 61. This latter area, as with the volume within the inlet portion 13, once filled, remains filled during the life of the meter and does not therefore interfere with meter volume for measurement purposes. Fluid cannot pass through the valve seat 55 since the valve bead 77 is biased toward the inlet passage 17 by the relative camming action of the V-shaped portions 95 of the spring clip 91 and the camming surface 81. Fluid passing through the inlet passage 17 therefore generates a pressure differential between the inlet portion 13 and outlet portion 15 of the housing 11, and specifically across the piston 47 and rolling diaphragm 49. This pressure differential overcomes the bias of the spring 75 so that the piston 47 is displaced toward the outlet passage 33, guided by the guide rods 27 and 43 reciprocating within the bearing apertures 25 and 39. During this reciprocation, the spring clips 91 remain biased toward one another so that the camming action between the V-shaped portions 95 and camming surface 81 maintains the valve head 87 engaged with the valve seat 55 so that the valve which bypasses the piston 47 is maintained closed. As soon as this reciprocating movement is initiated, the magnet 97 is moved from beneath the reed switch 99 and the reed switch 99 is allowed to open, signaling the initiation of a measurement.

Figures 4, 5:
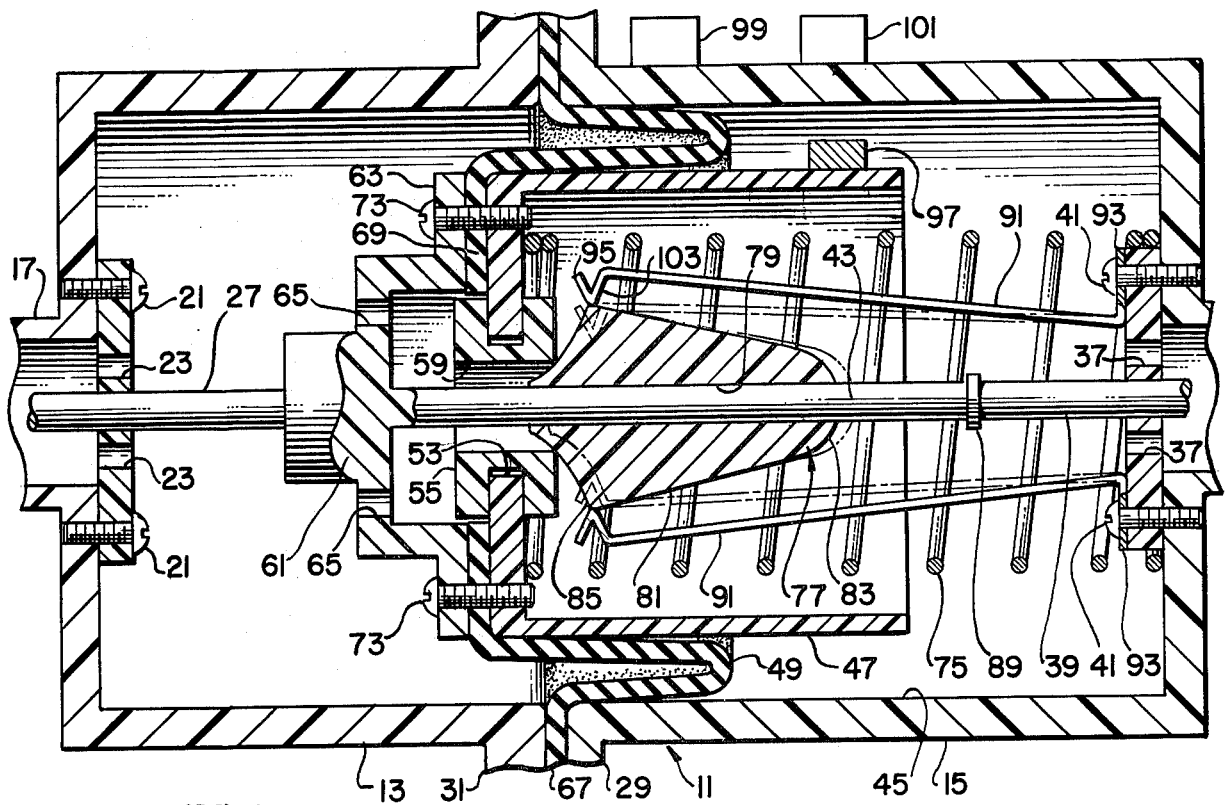

Referring now to FIG. 4, and specifically to the configuration of parts shown in solid lines in that figure, it will be seen that the piston 47 continues to progress in this manner toward the outlet passage 33 until the V-shaped camming portions 95 of the spring clips 91 reach the shoulder 85 of the valve bead 77. As the motion of the piston 47 progresses still farther, the V-shaped camming surfaces 95 pass over the shoulder 85 so that the inclined surface 103 of these camming elements 95 engages the shoulder 85. This engagement, shown in phantom lines in FIG. 4, abruptly draws the valve bead 77 toward the outlet passage 33, opening a passage between the valve head portion 87 and valve seat 55. This permits a flow of fluid from the inlet portion 13 to the outlet portion 15 and abruptly reduces the pressure differential across the piston 47 and piston head 61. The spring 75 is therefore permitted to reciprocate the piston 47 and piston head 61 toward the inlet passage 17, guided by the guide rods 27 and 39, with fluid flowing through the apertures 65 in the piston head 61 and the aperture 59 in the valve seat 55. The shoulder 85 will maintain the valve bead 77 captive within the V-shaped portion 95 of the spring clips 91 as the piston 47 moves toward the inlet passage 17.

It will be noted, in addition, that when the piston 47 has reached the end of its reciprocation toward the outlet passage 33, that is, when the V-shaped camming portions 95 are adjacent the shoulder 85 of the valve bead 77, the bar magnet 97 has moved to a position beneath the magnetic reed switch 101 so that this switch is activated to produce an electrical signal indicating the end of the time period required to displace the piston 47 through a predetermined stroke, which in turn signals the end of a period required for the passage of a predetermined quantity of fluid through the inlet passage 17.

As shown in FIG. 5, and particularly the solid line element positions of FIG. 5, the valve bead 77 remains captive of the spring clips 91 until the piston 47, along with the piston head 61 and guide rods 27 and 39, has moved under the force of the spring 75 to a position adjacent the starting location described in reference to FIG. 3. Since a free flow of fluid is permitted through the bypass valve 55, this motion of the piston toward the inlet port 17 is abrupt and will bring the bead stop 89 into contact with the captive valve bead 77. The bead stop 89 will impact against the spherical end 83 of the valve bead 77, the spring 75 providing sufficient force to jar the V-shaped camming portions 95, and particularly the camming surface 103 thereof, around the shoulder 85 of the valve bead 77. The valve bead 77 is thus jarred forward to the broken line position shown in FIG. 5 so that the V-shaped camming elements 95 reside on the camming surface 81 of the valve bead 77. The spring bias of the spring clips 91 operates thereafter to cam the valve bead 77 toward the inlet port 17 until the valve bead 77 closes the valve seat 55. The structure, at this point in time, once again resides in the position shown in FIG. 3 to initiate a successive cycle. Once the piston 47 has returned to this initial position, the bar magnet 97 will again actuate the switch 99 to signal the start of another measurement cycle.

It will be understood that the pressure differential which is generated across the piston 47 when the valve 77 is closed is sufficient to move this piston 47, overcoming the bias of the spring 75. The differential is insufficient, however, to overcome the bias of the spring clips 91 acting with the camming elements 95 and 81 to displace the valve bead 77 from the orifice 59 in the valve seat 55. This is accomplished through a proper selection of spring constants and pretension of the springs 75 and 91 and through a proper selection of the size of the orifice 59.

It will be recognized that a small amount of fluid may pass from the inlet passage 17 to the outlet passage 33 as the piston 47 is displaced from its location adjacent the outlet passage 33 as shown in FIG. 4 to its position adjacent the inlet passage as shown in FIG. 5. This amount of fluid will be insignificant in relation to the amount of fluid which passes through the inlet 17 and outlet 33 during the reciprocation when the valve bead 77 is closed against the valve seat 55. Thus, this small amount of fluid does not substantially interfere with the total measurement of fluid. The total fluid which passes through the fluid meter may therefore be determined by counting the output pulses of either of the magnetic reed switches 99 or 101. The amount of fluid required to displace the piston 47 is accurately predetermined, so that this quantity may be multiplied by the number of pulses to produce an accurate measurement of total flow.

Alternatively, if it is desired to operate this meter as a flow rate meter rather than a total quantity of flow meter, the slight inaccuracy created by the fluid flowing during retraction of the piston 47 may be removed altogether. This is accomplished by accurately measuring the time required for the piston 47 to move from the position shown in FIG. 3 to the position shown in FIG. 4, and by measuring the time lag between opening of the magnetic reed switch 99 and closing of the reed switch 101. If, for example, this meter is to be used as a portion of a mile-per-gallon indication system in a vehicle, the time duration between actuation of the magnetic reed switches 99 and 101 produces an accurate measurement of time per quantity which may be calibrated, for example, in terms of hours per gallon. If these signals are used in conjunction with the output of a vehicle speedometer which measures, for example, in terms of miles per hour, a simple multiplication of these factors produces a direct output signal which may be digitally computed in terms of miles per gallon.

An alternate arrangement for monitoring the flow of fluid through the meter of the present invention, and of avoiding the slight inaccuracy created by fluid flowing during the retraction of the piston 47, is shown in FIG. 6. In this alternate embodiment, all of the elements are identical to those described and shown in reference to FIGS. 1 through 5, except for the valve bead 77. As shown in FIG. 6, the shoulder 85 of the valve bead 77 includes a circular ring 107 of electrically conductive material, such as, for example, a ring of metal which may be adhesively bonded just inside the shoulder 85. In addition to this modification, a pair of wires 109 and 111 may be electrically connected to the spring clips 91. Thus, if the valve bead 77, the bearing plate 35, and the outlet portion 15 of the housing 11 are constructed of nonconductive material, the spring clips 91 will normally be electrically isolated from one another. However, when the valve bead 77 is captive within the V-shaped camming portions 95 of the spring clips 91, the camming surface 103 of these portions 95 will contact the conductive ring 107 formed on the valve bead 77. Thus, electrical continuity will be generated between the spring clips 91 and their respective lead-in wires 109 and 111. By monitoring the conductivity or resistance between the lead wires 109 and 111, it is possible to externally monitor the times when the valve bead 77 is captive within the spring clips 91. A review of FIGS. 4 and 5 will make it apparent that, during the entire travel of the piston 47 in a direction toward the outlet passage 33, the V-shaped camming portions 95 of the spring clips 91 rest on the camming surface 81 of the valve bead 77. When the piston 47 reaches the extremity of its stroke toward the outlet passage 33, the valve bead 77 becomes a captive of the spring clips 91, such that conductivity is present between the lead-in wires 109 and 111 of FIG. 6. The valve bead 77 remains captive until the piston has been retracted to its initial position shown in dotted lines in FIG. 5 and solid lines in FIG. 3. Thus, during the entire retraction period when a small amount of fluid passes through the valve, which flow could otherwise generate a slight inaccuracy in the fluid flow rate measurement, the valve bead 77 is captive between the spring clips 91. By measuring the periods of time during which the lead-in wires 109 and 111 of FIG. 6 are electrically isolated from one another, it is possible to determine the time period required for a full positive displacement stroke of the piston 47. This measurement time period may then be used, as described above, for measuring hours per gallon and for in turn measuring mileage in a vehicle in terms of miles per gallon.

It should be noted that, since the fluid flow meter of the present invention is a positive displacement meter, that is, as the measurement occurs the valve bead 77 is closed against the valve seat 55 so that no flow occurs past the piston 47, this apparatus is capable of measuring an extremely wide range of flow rates. In particular, the apparatus will measure extremely low flow rates since there is virtually no limitation upon the time which may be required to reciprocate the piston 47 between the positions shown in FIG. 3 and FIG. 4.

What is claimed is:

1. A fuel flow meter for series connection in the fuel line of an engine, comprising:

a cylindrical housing having an inlet and an outlet at opposite ends, each connected to said fuel line;

a pair of bearings, one mounted at each end of said cylindrical housing;

a piston including an aperture forming a valve seat, said piston mounted within said housing on said pair of bearings for reciprocation along the axis of said cylindrical housing;

flexible sealing means for sealing said piston to said cylindrical housing during said reciprocation;

a spring positioned between said housing and said piston for biasing said piston toward said inlet;

a valve member mounted in alignment with said valve seat within said housing for reciprocation along the axis of said housing, said valve member closing said piston aperture when positioned against said aperture; and over center means mounted on said cylinder for reciprocating said valve member along the axis of said housing to open and close said piston aperture in response to the position of said piston along the axis of said housing.

2. A fuel flow meter as defined in claim 1 wherein said piston includes a pair of axially aligned guide rods rigidly attached to said piston for mounting said piston on said pair of bearings for reciprocation and wherein said valve member is mounted for reciprocation along one of said pair of guide rods.

3. A fuel flow meter as defined in claim 1 wherein said over center means for reciprocating said valve member comprises a spring member mounted on said cylinder for biasing said valve member toward said piston aperture when said piston is positioned in a first reciprocating extreme and for biasing said valve member away from said piston aperture when said piston is in a second reciprocating extreme position.

4. A fuel flow meter for series connection in the fuel line of an engine, comprising:

a cylindrical housing having an inlet and an outlet at opposite ends, each connected to said fuel line;

a pair of bearings, one mounted at each end of said cylindrical housing;

a piston including an aperture forming a valve seat, said piston mounted within said housing on said pair of bearings for reciprocation along the axis of said cylindrical housing;

flexible sealing means for sealing said piston to said cylindrical housing during said reciprocation;

a spring positioned between said housing and said piston for biasing said piston toward said inlet;

a valve member mounted in alignment with said valve seat within said housing for reciprocation along the axis of said housing, said valve member closing said piston aperture when positioned against said aperture, said valve member including a camming surface adjacent a camming shoulder; and means for reciprocating said valve member along the axis of said housing to open and close said piston aperture in response to the position of said piston along the axis of said housing, said reciprocating means comprising a spring member for biasing said valve member toward said piston aperture when said piston is positioned in a first reciprocating extreme and for biasing said valve member away from said piston aperture when said piston is in a second reciprocating extreme position, said spring member alternately biasing against said camming surface and said camming shoulder for biasing said valve member toward and away from said piston aperture respectively.

5. A fuel flow meter as defined in claim 4 additionally comprising:
a stop member positioned on said piston for jarring said bias means from said camming shoulder to said camming surface when said piston reaches said second reciprocating extreme.

6. A fuel flow meter as defined in claim 1 wherein said flexible sealing means comprises an annular rolling diaphragm sealed to said piston and said cylindrical housing.

7. A fuel flow meter as defined in claim 1 additionally comprising:
a switch mounted on said cylindrical housing and actuated by said reciprocating piston for permitting monitoring of the reciprocation of said piston.

8. A fuel flow meter as defined in claim 5 wherein said switch is a magnetic reed switch mounted externally of said cylindrical housing, said fuel flow meter additionally comprising:
a magnet mounted on said piston for intermittently actuating said magnetic reed switch in accordance with the position of said piston.

9. A meter for measuring the rate of flow of a fluid in a conduit, comprising:
a housing having an inlet and outlet connected in series with said conduit;
positive displacement reciprocating means mounted within said housing for separating said housing into an inlet chamber and an outlet chamber;
means for sealing said reciprocating means to said housing during motion of said reciprocating means;
means biasing said reciprocating means toward said inlet chamber; and
flow control means comprising:
a valve for controlling fuel flow through said housing past said reciprocating means, and
an over center spring mounted on said housing; said spring opening said valve during motion of said reciprocating means toward said inlet chamber, said spring closing said valve during motion of said reciprocating means toward said outlet chamber.

10. A meter for measuring the rate of flow of a fluid as defined in claim 9 wherein said over center spring is responsive to said reciprocating means and opens and closes said valve in response to the relative position of said reciprocating means and said housing.

11. A meter for measuring the rate of flow of a fluid as defined in claim 10 wherein said valve comprises:
a first valve element mounted on said reciprocating means for reciprocation with said reciprocating means; and
a second valve element operative to close said first valve element, said second valve element reciprocating within said housing independently of said reciprocating means.

12. A meter for measuring the rate of flow of a fluid as defined in claim 9 additionally comprising:
means for externally monitoring the position of said reciprocating means within said housing, said monitoring means comprising an electrical switch activated in response to the position of said reciprocating means.

13. A meter for measuring the rate of flow of a fluid in a conduit, comprising:
a housing having an inlet and an outlet connected in series with said conduit;
positive displacement reciprocating means mounted within said housing for separating said housing into an inlet chamber and an outlet chamber; said reciprocating means comprising:
a piston;
a pair of guide rods mounted coaxially on alternate ends of said piston; and
a passage through said piston concentric with one of said guide rods;
means for sealing said reciprocating means to said housing during motion of said reciprocating means;
means biasing said reciprocating means toward said inlet chamber; and
flow control means permitting fluid flow through said housing past said reciprocating means during motion of said reciprocating means toward said inlet chamber, said flow control means prohibiting fluid flow past said reciprocating means during motion of said reciprocating means toward said outlet chamber, said permitting means comprising a valve member for sealing said passage concentric with said guide rod, said valve member reciprocating on one of said pair of guide rods independently of said piston.

14. A meter for measuring the flow of a fluid, comprising:
a housing having an inlet and an outlet;
a piston mounted for reciprocation within said housing between a pair of extremes adjacent said inlet and said outlet;
valve means for bypassing fluid around said piston between said inlet and said outlet, said valve means closing when said piston is at said extreme adjacent said inlet and opening when said piston is at said extreme adjacent said outlet end; said valve means comprising:
an orifice for bypassing fluid around said piston; and
a valve member selectively closing against the downstream end of said orifice;
means for biasing said piston toward said extreme adjacent said inlet end; and
means for producing an output signal in response to the position of said piston within said cylinder.

15. A meter for measuring the flow of fluid as defined in claim 14 wherein said orifice reciprocates with said piston; and wherein said valve member is mounted within said housing for reciprocation independent of the reciprocation of said piston but along the same axis as said piston reciprocation.

16. A meter for measuring the flow of a fluid as defined in claim 15 additionally comprising:
means for biasing said valve member to a position adjacent said orifice when said piston is at said extreme adjacent said inlet, said means biasing said valve member away from said orifice when said piston is at said extreme adjacent to said outlet end.

17. A meter for measuring the flow of a fluid as defined in claim 16 wherein said means for biasing said valve member maintains said valve member adjacent said orifice after said piston has reached said extreme adjacent said inlet end and before said piston has reached said extreme adjacent said outlet end.

18. A meter for measuring the flow of a fluid as defined in claim 14 wherein said means for producing an output signal comprises a switch mounted externally of said housing.

19. A meter for measuring the flow of a fluid as defined in claim 18 wherein said switch comprises a magnetic reed switch, said meter additionally comprising:
- a magnet mounted for reciprocation with said piston for activating said magnetic reed switch.

20. A meter for measuring the flow of a fluid comprising:
- a housing having an inlet and an outlet;
- a piston mounted for reciprocation within said housing between a pair of extremes adjacent said inlet and said outlet;
- valve means for bypassing fluid around said piston between said inlet and said outlet, said valve means closing when said piston is at said extreme adjacent said inlet and opening when said piston is at said extreme adjacent said outlet end, said valve means comprising:
  - an orifice for bypassing fluid around said piston; and
  - a valve member selectively closing against the downstream end of said orifice; and
- means for biasing said piston toward said extreme adjacent said inlet end.

21. A meter for measuring the rate of flow of a fluid comprising:
- a housing having an inlet and an outlet;
- positive displacement reciprocating means mounted within said housing for separating said housing into an inlet chamber and an outlet chamber, said positive displacement reciprocating means including a through orifice connecting said inlet chamber and said outlet chamber;
- a valve for selectively closing said orifice; and valve-actuating means for moving said valve toward said outlet end to open said valve when said reciprocating means is adjacent said outlet end.

22. A meter for measuring the rate of flow of a fluid as defined in claim 21, wherein said valve-actuating means closes said valve by moving said valve toward said inlet end when said reciprocating means is adjacent said inlet end.

23. A meter for measuring the rate of flow of a fluid comprising:
- a housing having an inlet and an outlet;
- a piston mounted for reciprocating within said housing between a pair of extremes adjacent said inlet and said outlet;
- valve means for bypassing fluid around said piston between said inlet and said outlet, said valve means having a camming surface;
- means for biasing said piston toward said extreme adjacent said inlet end; and
- cam actuated means acting on the camming surface of said valve means for opening said valve means when said piston is at said extreme adjacent said outlet end.

24. A meter for measuring the rate of flow of a fluid as defined in claim 23, wherein said cam actuated means closes said valve means when said piston is at said extreme adjacent said inlet end.

25. A meter for measuring the rate of flow of a fluid comprising:
- a housing having an inlet and an outlet;
- a piston;
- a piston rod mounting said piston for reciprocating within said housing between a pair of extremes adjacent said inlet and said outlet;
- valve means reciprocating on said piston rod independent of said piston reciprocation, said valve means bypassing fluid around said piston between said inlet and said outlet;
- means for closing said valve means when said piston is at said extreme adjacent said inlet and opening said valve means when said piston is at said extreme adjacent said outlet end; and
- means for biasing said piston toward said extreme adjacent said inlet end.

* * * * *